United States Patent Office 2,880,092
Patented Mar. 31, 1959

2,880,092

METHOD OF PROTECTING BEER FROM AIR CONTAMINATION

Anthony L. Nugey and Anthony J. Nugey, Rahway, N.J.

No Drawing. Application November 22, 1954
Serial No. 470,542

2 Claims. (Cl. 99—48)

Our invention relates to an efficient method for the protection of beer in the process of manufacture, and particularly during the aging of the beverage.

The term "beer" as used herein includes all malt beverages and those produced with malt and various adjuncts such as ales and the like, fermented with either top or bottom fermenting yeasts.

In the manufacture of beer by the usual well-known methods, aqueous extracts termed worts are prepared from malts, pre-gelatinized cereals, carbohydrates and non-gelatinized cereals requiring complete gelatinization of their respective starch granules before being combined with the extracts derived from malt and/or malts with pre-gelatinized cereals.

After the worts have been separated from their spent grains they are boiled in the brewkettle with hops added. These worts are subsequently fermented with top or bottom fermenting yeasts and the finished brews resulting therefrom are filtered, clarified and carbonated and then pumped to racker or government bottling tanks from which draft beer is transferred to suitable kegs; and to bottling tanks from which the beer is drawn to filling apparatus for filling cans and bottles, which are then pasteurized by steaming to destroy any yeast cells or other microorganisms that may be contained therein.

Between the brewkettle and the package filling apparatus, beer is constantly in contact with air. During certain phases in the manufacture air is very desirable and essential for the production of a satisfactory beer; but at other stages the presence of air is very detrimental and brings about a very unsatisfactory product.

Introducing air into the brewkettle produces essential reactions, as for example, giving improved flocculation of undesirable proteins commonly referred to in practice as kettle-breaks. Oxidation reactions induced by the air at the coolship and wort cooler, for example, aids in the precipitation of undesirable sludge and subsequently aids in the propagation of yeast. Also, during the fermenting cycle, air accelerates the degradation of fermentable sugars into carbon dioxide and alcohol. During the process of fermentation the liberated carbon dioxide expels surplus air from the fermented beer and protects it from air contact by blanketing or covering the surface of the liquid with this inert and antiseptic organic gaseous compound.

After fermentation has been completed, the beer must be aged over some definite period. In continental Europe beer is generally aged for not less than 4 months; while in the United States, Canada and Latin America, beer is seldom aged longer than 8 weeks. Elaborate studies show that a clean tasting beer free from yeasty odors, bitterness, and objectionable albumins, with properly saturated and bound-in carbon dioxides, cannot be secured without aging for at least two months.

Regardless of the length of the aging period, air must be kept from coming in contact with beer during this period. Oxidation sensitivity of beer ingredients, such as maltose, peptones, glucose, laevulose, tannins and hop resins are known to affect flavor, aroma, taste, color and brilliancy. All of these ingredients have a definite affinity for oxygen and consequently if contact with air were permitted during aging the beer would be adversely affected in a marked degree.

It is known that the atmosphere contains approximately 21% oxygen and 79% nitrogen. Oxygen is easily soluble in beer. It is actually twice as soluble as air. Careful tests on beer samples obtained during its transfer into storage (aging) tanks reveals varying percentages of free oxygen dissolved in beer. Under certain conditions, up to 40% of free oxygen was present in beer being transported into storage tanks. After a relatively short period the original oxygen content indicated above was reduced to around 15%. This indicates that oxygen does chemically combine with different beer ingredients named herein.

Tests have revealed further that decarbonated beer (devoid of foam) and otherwise unprotected from the air, develops a pronounced haze quickly with pronounced malodors; while the same beer in a receptacle with a foam cover prevented air contact with the beer and the beverage remained clear, brilliant and free from odors.

A great deal of research has been spent with respect to organic and inorganic additives to counteract the effects of oxidation. Several of these additives are diphenylamines, (iso-ascorbic), ascorbic acid, propylgallate, nordihydroguaiaretic acid and fungal enzymes. Such additives are wholly unsatisfactory. For example, diphenylamines are toxic coal tar derivatives and when admixed with sucrose bases are ideal media for growth of microorganisms; ascorbic acids are strong acids which destroy natural beer aroma and flavors; nordihydroguaiaretic acid is not soluble in beer and weakens chillproofiing mediums; and fungal enzymes are too costly and require the addition of other oxygen producing chemicals in order to give desired results. All of the aforementioned additives generate harmful by-products in beer.

Our invention comprises a process and product that fully prevents air from coming in contact with beer while it is undergoing aging in ruh tanks, storage and finishing tanks; as well as in racker and government bottling tanks.

The specific gravity of beer ranges from 1.00800 to 1.01602 as compared to pure water which is 1.00000 under standard temperature and pressure conditions. Our invention resides in the use of any semi-inorganic or organic substances which will have a specific gravity substantially lower than either beer or pure water, which are wholly insoluble in beer or water and which is entirely free from odors.

An object of our invention is to provide for the beer during aging and/or in racker and government bottling tanks a protective blanket, or air resistant cover, which is reusable. This air resistant cover includes substances of a semi-inorganic fluid having high resistance to heat and oxidation, is non-volatile and insoluble in beer which has a pH value ranging from 3.9 to 4.9 and will be free from odors and taste.

A still further object of our invention is to provide for the beer during aging and/or in racker and government bottling tanks a protective blanket, or air resistant cover, which is reusable and shall include substances of an organic nature such as cork, waxes and synthetic resins.

A still further object of our invention is to eliminate the use of anti-oxidant additives in the beer, and to dispense with carbon dioxide under pressure in the tanks where the beer is stored while aging.

Commercial liquid silicones are ideally suited for this purpose. They are essentially semi-inorganic and may be briefly described as containing silica and oxygen with other organic radicals attached thereto.

Using commercial liquid silicones, we have found that the grades suitable for this purpose have these properties. Viscosity range from 10 thru 1,000 centistokes at 25° C.; boiling point not less than +200° C.; freezing point −50° C., with a lower surface tension than beer or water in the range of 19.5 to 21.1 dynes per centimeter; and preferably those grades which are wholly transparent. The quantity added into ruh tanks, storage and finishing tanks during aging and/or in racker and government bottling tanks should be sufficient to form a protective layer of 1/64 to 1½ inches thick upon and over the entire surface of the beer.

Having described our invention, what we believe to be new is:

1. The process of preventing air from affecting beer during storage in containers for aging, which consists in covering the top surface of the beer with a layer of a substance consisting of liquid silicones.

2. The process of preventing air from affecting beer during storage in containers for aging, which consists in covering the top surface of the beer with a layer of a substance consisting of liquid silicones, having a depth of not less than 1/64 of an inch or more than one and a half inches, a viscosity of not less than 10 or more than 1000 centistokes at 25 degrees centigrade, a boiling point of not less than 200 degrees centigrade, a freezing point of minus 50 degrees centigrade, and a surface tension of not less than 19.5 or more than 21.1 dynes per centimeter.

References Cited in the file of this patent

UNITED STATES PATENTS

| | | |
|---|---|---|
| 2,375,007 | Larsen | May 1, 1945 |
| 2,474,704 | Thayer | June 28, 1949 |
| 2,512,192 | Yen | June 20, 1950 |